G. E. PENDERGAST.
PRESSURE DETECTOR.
APPLICATION FILED JAN. 7, 1920.

1,408,221.

Patented Feb. 28, 1922.
2 SHEETS—SHEET 2.

INVENTOR
George Edwin Pendergast.
BY
ATTORNEY.

UNITED STATES PATENT OFFICE.

GEORGE E. PENDERGAST, OF WASHINGTON, DISTRICT OF COLUMBIA.

PRESSURE DETECTOR.

1,408,221.  Specification of Letters Patent.  Patented Feb. 28, 1922.

Application filed January 7, 1920. Serial No. 350,021.

*To all whom it may concern:*

Be it known that I, GEORGE EDWIN PENDERGAST, a citizen of the United States, and a resident of the city of Washington, District of Columbia, have invented a certain new and useful Pressure Detector, of which the following is a specification.

Considerable difficulty is experienced aboard steamships equipped with turbines due to the fact that the reduction gears of the turbines are not properly lubricated with the result that stripping of the gears and other ill effects take place.

The leading object of the present invention is to overcome this disadvantageous feature and to provide means whereby should a system of lubricant supply to a turbine cease to properly function, with a resultant drop in lubricant pressure, a signal is given the operator in charge so that a proper flow of lubricant may be re-established. Other and further objects relate to the provision of certain new and novel arrangements, combinations and connections of parts for attaining the results sought by said leading object. A still further object is to provide means whereby a rise in fluid pressure, above a predetermined amount, will also serve to operate a signal.

The invention consists of the improvements hereinafter described and finally claimed.

The nature, characteristic features and scope of the invention will be more fully understood from the following description taken in connection with the accompanying drawings forming part hereof and in which.

Figure 1:
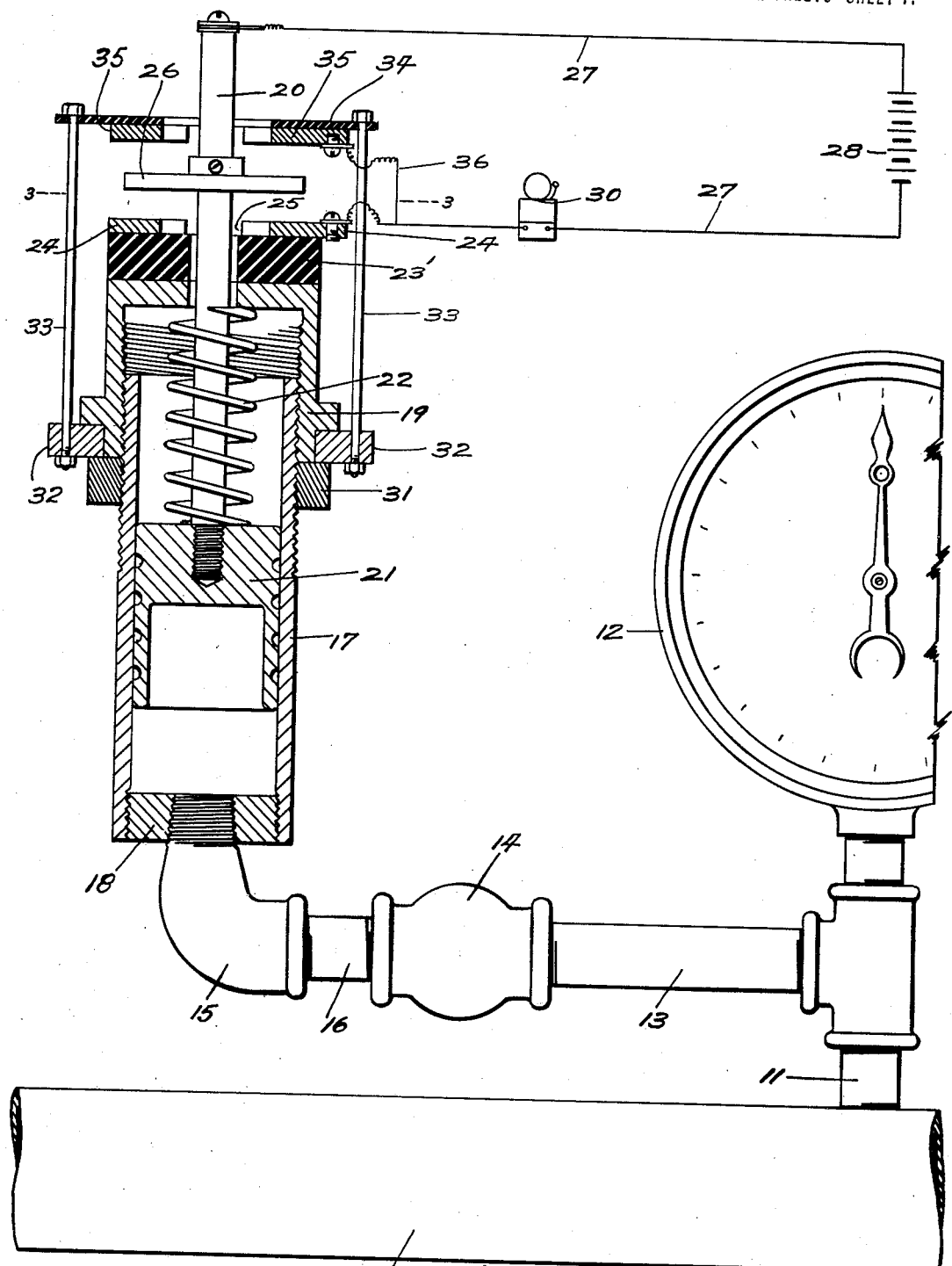
Fig. 1, is a view in central section of a pressure detector embodying features of the invention, the piston and its parts being shown in the position of normal working conditions of a lubricating system.
Figure 2:
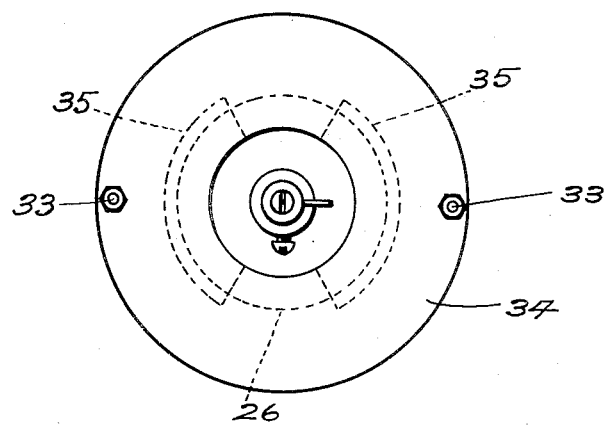
Fig. 2, is a top or plan view of the detector shown in Fig. 1.
Figure 3:
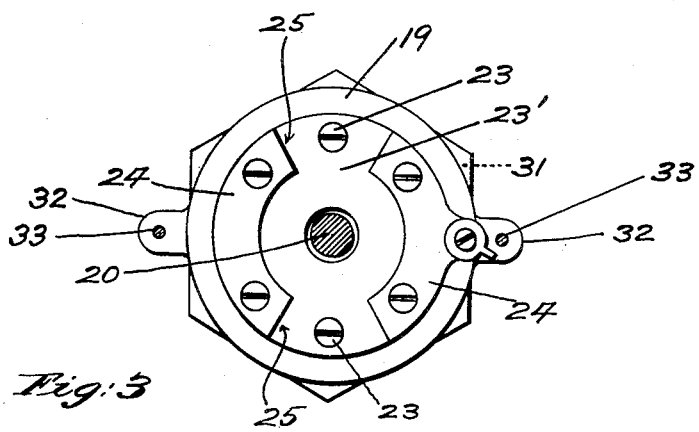
Fig. 3, is a view in cross-section taken upon the line 3—3 of Fig. 1.

For the purpose of illustrating my invention, I have shown in the accompanying drawings one form thereof which is at present preferred by me, since the same has been found in practice to give satisfactory and reliable results, although it is to be understood that the various instrumentalities of which my invention consists can be variously arranged and organized and that my invention is not limited to the precise arrangement and organization of the instrumentalities as herein shown and described.

The pressure detector of the present invention is applicable for use in connection with oil, water, steam, gas and similar systems of supply in which predetermined pressure is desired. The device is particularly adaptable, however, for use in connection with lubricating oil systems and the following description, for illustrative purposes, will be restricted thereto. In the drawings 10 designates the supply pipe of a lubricating oil system such for instance as is used aboard ship in connection with the reduction gears of the turbines. 11 designates a pressure gauge line leading therefrom and 12 a pressure gauge. Connecting with the pressure gauge line is a short section of pipe 13 fitted to which is an insulating coupling 14. Connecting the coupling and an L 15 is a nipple 16. The L 15 supports the casing 17 of the detector. The casing is cylindrical in shape and is internally screw-threaded at its lower end to receive a plug 18 having a tapped, central aperture. The L 15 engages said tapped aperture. The upper portion of said casing is interiorly screw-threaded to receive a cap 19 the top of which is centrally apertured for the working therethrough of the piston rod 20 of a piston 21 located in said casing 17. The piston rod has screw-threaded engagement with the piston and a spring 22 is interposed between the piston top and under face of the cap top. Fixed to the top of the cap, as by screws 23 is a disc 23' of insulating material, as fibre, which is apertured in register with the cap aperture. Mounted upon the said disc are a pair of spaced segmental plates 24 of conductive material as brass. These plates are disposed concentrically with respect to the disc 23' and the spaces 25 therebetween serve as vents for the escape of lubricant as may seep past the piston. Thus the plates 24 are maintained free of lubricant so that good contacts may be had between these plates and a disc to be presently described. Fixed to that part of the piston rod which projects through and beyond the said cap, disc and plates is a disc 26 of conducting material as brass, the piston rod being of similar material. Connecting the outer end of the piston rod and one of the plates 24 is a local circuit 27 in which is located a battery 28. A signal device is interposed in said local circuit. For illustrative purposes, I have shown an audible signal in the form of an electric bell 30.

In operation cap 19 is adjusted with respect to casing 17 to obtain a desired tension of spring 22 according to the pressure of lubricant to be maintained. A lock-nut 31 is employed for maintaining the cap in such adjusted position. An example of such adjusted parts is shown in Fig. 1. As long as the pressure of lubricant is maintained constant the disc 26 on the piston rod is maintained free of the plates 24. However, with the lowering of oil pressure, contact is formed between these parts with the result that a signal is given the operator in charge.

In case the detector is employed in a system for feeding water, air and the like a stuffing box is required for that part of cap 19 through which works the piston rod. The plates 24 serve to maintain the disc 26 in horizontal position when the circuit is closed in contra-distinction to a tilting position as would be the case if only one plate were employed. Thus good contacts are had.

It may be sometimes desirable to have the device of the invention respond to rises in fluid pressure. In such case I employ the following parts. Carried between the lock-nut 31 and the hexagonal rim of cap 19 is a disc provided with lugs 32. These lugs support a disc 34 of insulating material carried by rods 33. The disc is centrally apertured for the passage therethrough of the piston rod 20 and is located above the disc 26. Fixed to the underside of the disc 34 are segmental contact plates 35 similar to the contact plates 24. A conductor 36 connects one of the plates 35 with the local circuit 27. In operation cap 19 is adjusted with respect to casing 17 to obtain a desired tension of spring 22 according to pressure of fluid to be maintained as long as fluid pressure is maintained at predetermined amount disc 26 remains free of contact plates 35. However, with a rise of fluid pressure contact is formed between these parts with the result that a signal is given as before described. Thus the device may be employed to detect drop of pressure, rise of pressure or both.

It will now be apparent that I have devised a novel and useful construction which embodies the features of advantage enumerated as desirable in the statement of the invention and the above description and while I have in the present instance shown and described the preferred embodiment thereof which has been found in practice to give satisfactory and reliable results, it is to be understood that the same is susceptible of modification in various particulars without departing from the spirit or scope of the invention or sacrificing any of its advantages.

What I claim is:

1. A device of the character stated comprising a casing open to the admission of fluid pressure, a piston including a piston rod mounted in said casing, said piston being responsive to change in fluid pressure, a cap adjustably mounted with respect to said casing and through which the piston rod is projected, a contact supported with respect to and insulated from said cap, means adjustable with said cap extended above said cap, a contact carried by said means and aligned with the first mentioned contact and a contact carried by said piston rod for contacting with one or the other of said contacts according to pressure within said casing.

2. A device of the character stated comprising a casing open to the admission of fluid pressure, a piston including a piston-rod mounted in said casing, said piston being responsive to change in fluid pressure, a cap adjustably mounted with respect to said casing and through which the piston-rod is projected, a contact supported with respect to and insulated from said cap, means adjustable with and extended above said cap, a contact carried by said means and aligned with the first mentioned contact, a contact carried by said piston-rod for contacting with one of the other of said contacts according to pressure within said casing and means co-operate with said cap and said adjustable contact carrying means for interlocking said means with respect to said cap.

3. A device of the character stated comprising a casing open to the admission of fluid pressure, a piston including a piston-rod mounted in said casing, said piston being responsive to change in fluid pressure, a cap adjustably mounted with respect to said casing and through which the piston-rod is projected, segmental, horizontally disposed contact plates supported with respect to and insulated from said cap said plates having spaces therebetween for the escape of fluid as may seep through said cap and a horizontally disposed disc-like contact carried by said piston-rod and concentrically disposed with respect to contact plates.

In witness whereof, I have hereunto signed my name.

G. E. PENDERGAST.